United States Patent
Muncaster et al.

(10) Patent No.: US 9,468,205 B1
(45) Date of Patent: Oct. 18, 2016

(54) TERMITE BARRIER FOR BATH TRAP

(71) Applicants: John W. Muncaster, Ennis, TX (US); Carlos Montoya, Ennis, TX (US)

(72) Inventors: John W. Muncaster, Ennis, TX (US); Carlos Montoya, Ennis, TX (US)

(73) Assignee: Polyguard Products, Inc., Ennis, TX (US)

(*) Notice: Subject to any disclaimer, the term of this patent is extended or adjusted under 35 U.S.C. 154(b) by 0 days.

(21) Appl. No.: 14/883,014

(22) Filed: Oct. 14, 2015

(51) Int. Cl.
| | |
|---|---|
| *A01K 3/00* | (2006.01) |
| *A01M 29/34* | (2011.01) |
| *E04B 1/72* | (2006.01) |
| *E04B 1/66* | (2006.01) |
| *E04B 5/44* | (2006.01) |
| *E04B 5/48* | (2006.01) |
| *E04B 1/70* | (2006.01) |

(52) U.S. Cl.
CPC ............... *A01M 29/34* (2013.01); *E04B 1/66* (2013.01); *E04B 1/70* (2013.01); *E04B 1/72* (2013.01); *E04B 5/44* (2013.01); *E04B 5/48* (2013.01)

(58) Field of Classification Search
CPC .... E02D 31/02; E02D 31/008; A01M 29/34; E04B 5/48; E04B 1/72; E04B 1/70; E04B 1/66; E04B 5/44
USPC .............................. 52/101, 107, 132.1, 169.5
See application file for complete search history.

(56) References Cited

U.S. PATENT DOCUMENTS

| | | | | |
|---|---|---|---|---|
| 3,253,075 A * | 5/1966 | McLaughlin | ............ | B05D 7/22 264/270 |
| 4,091,135 A * | 5/1978 | Tajima | .................... | B32B 37/24 428/131 |
| 4,674,249 A * | 6/1987 | Bennett, Jr. | ............... | E04B 7/00 108/901 |
| 5,740,638 A * | 4/1998 | Shepherd, III | ........ | E02D 31/008 52/169.5 |
| 6,904,723 B1 * | 6/2005 | Moore | .................... | E02D 31/02 454/341 |
| 7,603,816 B1 * | 10/2009 | Hohmann, Jr. | ....... | E04B 1/2604 43/132.1 |
| 8,607,525 B2 * | 12/2013 | Trotter | .................... | E02D 31/02 52/169.5 |
| 2006/0213117 A1 * | 9/2006 | Middleton | .............. | A01M 1/24 43/98 |
| 2007/0245894 A1 * | 10/2007 | Poulis | ................... | E02D 31/008 96/4 |
| 2011/0094652 A1 * | 4/2011 | Duvekot | ................... | E04B 1/66 156/60 |

* cited by examiner

*Primary Examiner* — Basil Katcheves
(74) *Attorney, Agent, or Firm* — Jack A. Kanz

(57) ABSTRACT

A termite-proof bath trap barrier comprising a termite-proof screen with a pass-through hole therein which permits a conduit to pass therethrough. The conduit is secured in the pass-through hole in the screen with a termite-proof adhesive sealant which completely blocks passage of pests through the hole. The screen is secured to the top surface of the slab with a termite-proof adhesive sealant after the conduit is secured in its end-use position.

5 Claims, 3 Drawing Sheets

TERMITE BARRIER FOR BATH TRAP

This invention relates to means and methods for preventing encroachment of pests into residential and commercial structures supported on a concrete slab. More particularly, it relates to structures and construction methods for forming barriers which prevent entry of termites and other pests through openings such as bath traps and the like in concrete slabs.

In most conventional residential and commercial constructions which are built on a concrete slab, an opening (commonly referred to as a "bath trap" or "block-out") is formed in the slab. The bath trap is designed to permit subterranean conduits such as water lines, etc., to enter the structure and to permit water and the like which collects within the structure to drain into the supporting earth through the bath trap. Unfortunately, the bath trap provides an open pathway for ingress of burrowing pests such as termites, rodents and the like unless a suitable barrier is provided which permits passage of liquids but prevents passage of such burrowing pests.

In conventional construction, the bath trap is usually left open. However, in an attempt to deter pest encroachment, some construction techniques employ securing a barrier screen or the like within the bath trap to prevent ingress and egress of pests. Since the bath trap is positioned so that the upwardly extending entry ends of the subterranean conduits extend through the bath trap for later attachment to interior conduits as construction proceeds, the upwardly extending entry ends of such conduits must pass through any such barrier. Ordinarily, the screen is merely pierced in situ to accommodate the conduits and the horizontal position of the upwardly extending conduits is later adjusted to accommodate connection with interior plumbing. Such adjustment necessarily results in enlargement of the pass-through holes in the barrier screen, providing an unprotected breach in the barrier screen. Furthermore, placement of the barrier screen during formation of the concrete slab is tedious and time-consuming, resulting in unnecessary delays and barrier screens which are necessarily compromised as later construction progresses. Therefore, means and methods which avoid time-consuming construction delays while providing secure barriers against burrowing pests are highly desirable.

In accordance with the present invention, a secure barrier for bath traps is provided which is installed after the slab is formed (thus avoiding delays in forming the slab) and after (or simultaneously with) final positioning of the upwardly extending entry ends of the subterranean conduits. By positioning the upwardly extending entry ends before attaching the barrier screen to the concrete slab, unnecessary enlargement of the pass-through holes in the barrier is avoided and the barrier screen can be securely attached to the conduits, thereby avoiding formation of any entry paths through holes surrounding the conduits. The barrier screen is then secured to the surface of the concrete slab with termite-proof adhesive sealants to completely and fully block any ingress path through or around the barrier screen. Other features and advantages will become more readily understood from the following detailed description taken in connection with the appended claims and attached drawing in which:

Figure 1:
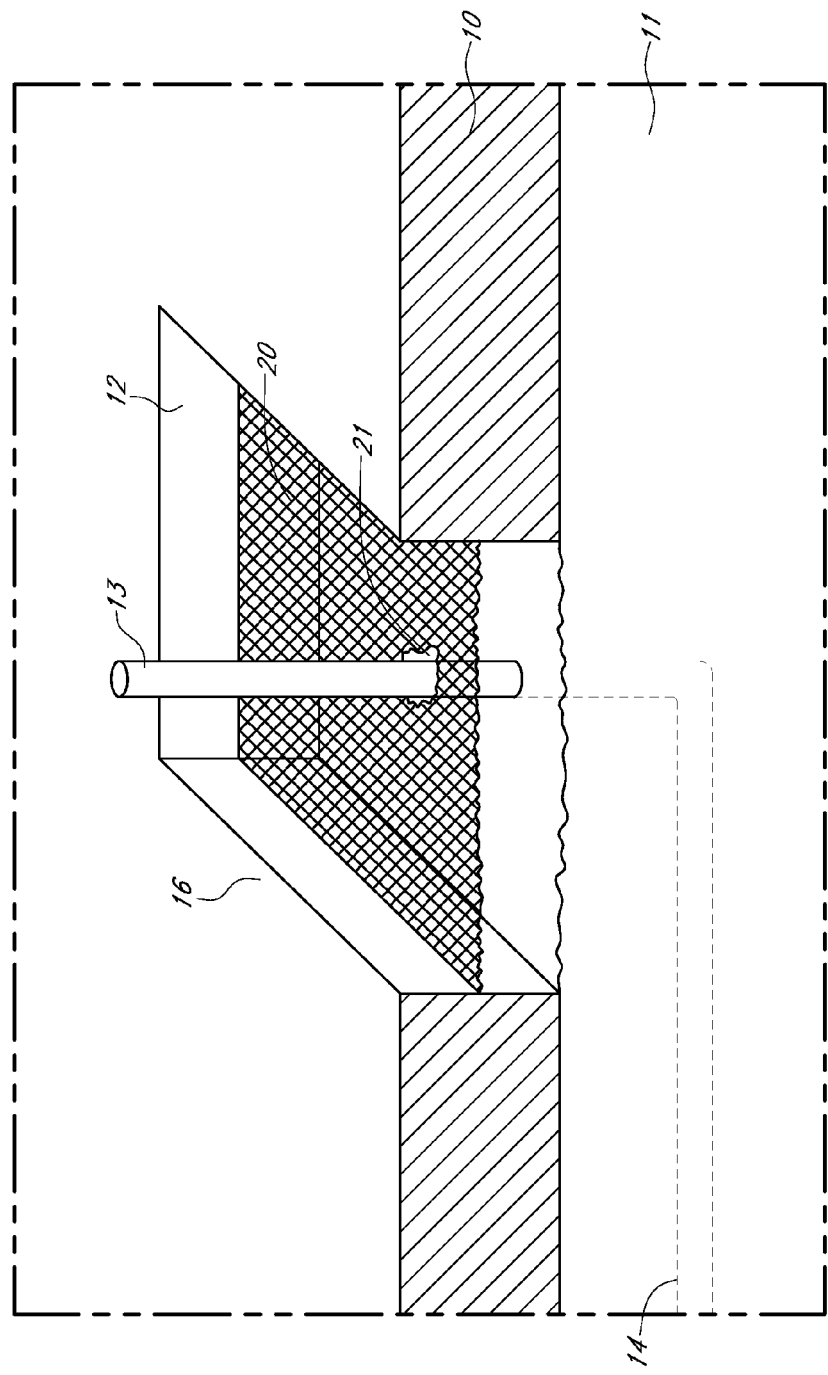
FIG. 1 is a pictorial illustration, partially in section, illustrating prior art slab construction incorporating a barrier screen in the bath trap.

The above-described drawing is incorporated into and forms part of the specification to illustrate exemplary embodiments of the invention. Throughout the drawing like reference numerals designate corresponding elements. The figures are not to scale but are intended to disclose the inventive concepts by illustration. This drawing, together with the description herein, serves to explain the principles of the invention and is only for the purpose of illustrating preferred and alternative examples of how the invention can be made and used.

It will be recognized that the principles of the invention may be utilized and embodied in many and various forms. In order to demonstrate these principles, the invention is described herein by reference to specific preferred embodiments. The invention, however, is not limited to the forms illustrated and described. Furthermore, the invention is not limited to use in connection with any particular materials, size, shape or to use in any particular orientation of a bath trap or any barrier therefor.

The structure of prior art slab construction incorporating a bath trap is illustrated in FIG. 1 wherein a concrete slab 10 is formed over a prepared earthen support 11. The slab 10 includes an opening (referred to herein as a "bath trap") 12 positioned to receive the upwardly extending entry end 13 of a subterranean conduit 14. A barrier screen, typically consisting of stainless steel screen 20 is secured within the bath trap 12. As illustrated in FIG. 1, a pass-through hole 21 is formed in screen 20 to accommodate the upwardly extending entry end 13 of conduit 14 and the screen 20 is positioned within the bath trap 12 during formation of the slab so that screen 20 is permanently secured within the slab 12.

Placement of the screen 20 within the bath trap 12 during formation of the slab 10 is a tedious and time-consuming task, often causing costly delays in the construction process. Furthermore, since the screen 20 is secured in place during formation of the slab 12, the position of pass-through hole 21 is fixed with relation to the slab 10.

As is well known in the construction industry, the lateral position of the entry end 13 must frequently be adjusted during later construction when the entry end 13 is coupled with interior conduits such as interior plumbing and the like. Unfortunately, lateral re-positioning of the entry end 13 to accommodate later construction necessarily results in tearing of screen 20 and enlargement of hole 21. Such enlargement of hole 21 results in an unsecured open path for ingress and egress of burrowing pests such as termites, other insects, rodents and the like. Furthermore, the tearing often results in such irregularly-shaped holes 21 that the pass-through holes 21 cannot be readily or securely blocked with termite-proof materials.

Figure 2:
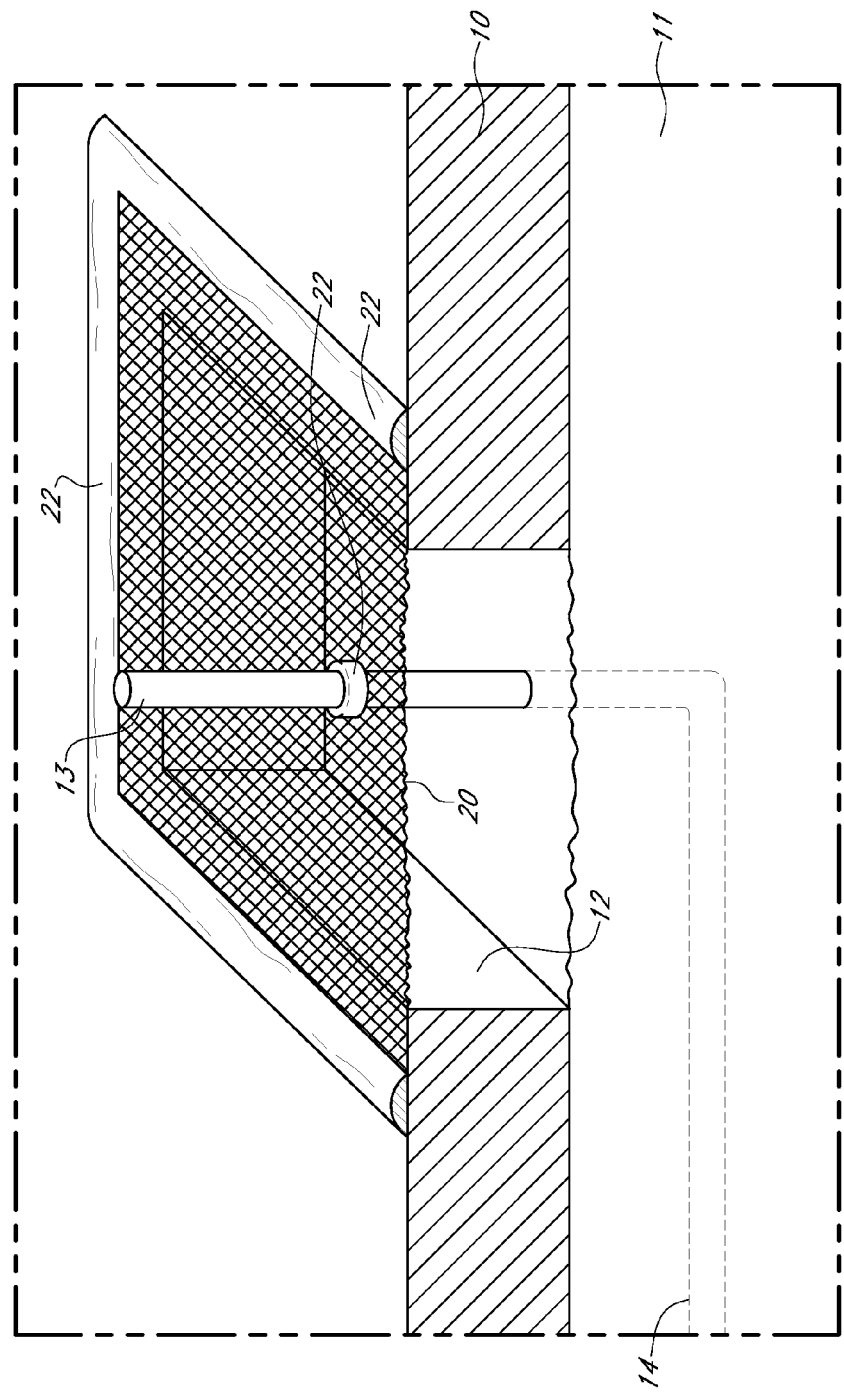
FIG. 2 is a pictorial illustration, partially in section, illustrating the final construction of a concrete slab incorporating a bath trap barrier formed in accordance with the present invention.
Figure 3:
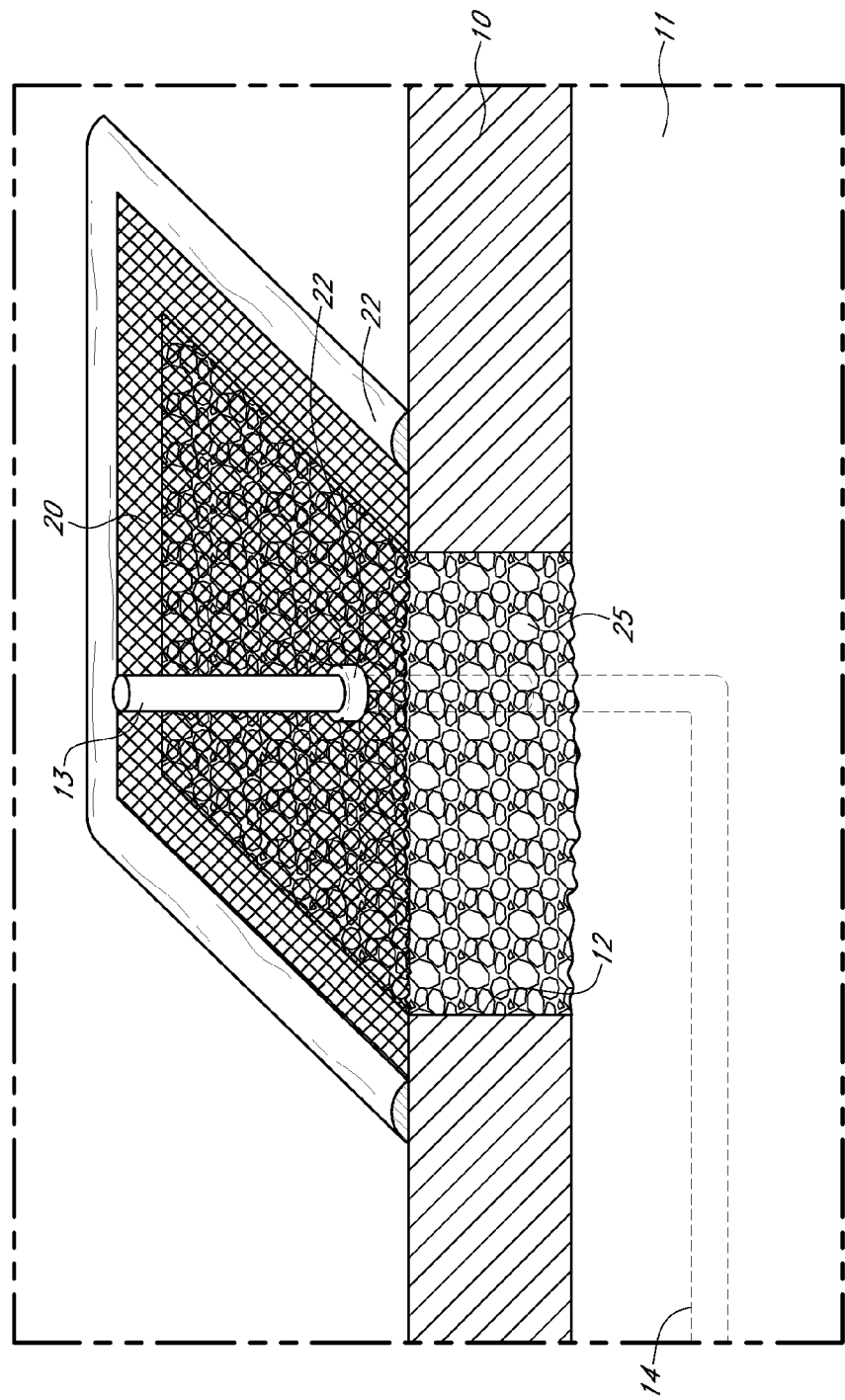
FIG. 3 is a pictorial view, partially in section, illustrating the final construction of an alternative embodiment of a bath trap barrier formed in accordance with the present invention.

The problems and disadvantages of conventional construction techniques are avoided by forming a bath trap barrier in accordance with the present invention. As illustrated in FIGS. 2 and 3, a slab 10 is formed over a prepared earthen support 11 as in conventional construction methods. A bath trap 12 is formed in the slab 10 to accommodate the upwardly extending entry end 13 of a subterranean conduit 14. However, no barrier screen (or other barrier structure) is incorporated in the slab formation process, thus avoiding the tedious and time-consuming process of securing a screen or the like to block the bath trap opening. Instead, the bath trap 12 is left open with the entry end 13 of conduit 14 extending therethrough.

As construction proceeds, a barrier is formed having suitable dimensions to fully cover the opening in bath trap 12 and extend over the surface 16 of slab 10 adjacent the edges of bath trap 12. In the preferred embodiment, the barrier comprises a stainless steel screen 20 with apertures sized to permit the passage of water but prevent the passage of termites. In practice, it has been found that aperture sizes in the range of about 0.018 inch or less are suitable for this purpose. Of course, the barrier need not be in the form of a screen. Any barrier material which can be formed as required and has apertures therein which permit passage of water but prevent passage of termites and which can be permanently bonded to the slab and conduits passing therethrough is suitable for practicing the invention. As used herein, the term "screen" is used to describe all such barriers.

A pass-through hole 21 (or multiple holes if a plurality of upwardly extending entry ends 13 extend through the bath trap 12) is formed in the screen 20. The hole 21 (or multiple holes) is formed to snugly fit around the walls of the upwardly extending end 13 of conduit 14 so that the screen 20 can be securely bonded to the conduit. However, the screen 20 is not secured to the slab 20 until the final position of the upwardly extending end 13 of the conduit 14 is determined.

While the screen 20 is not secured to the slab 10 the horizontal position of upwardly extending end 13 may be adjusted for coupling with interior conduits or plumbing without enlarging the pass-through hole 21 or tearing of screen 20. Instead, the screen 20 moves laterally with movement of the upwardly-extending end 13 as the position of entry end 13 is adjusted.

When the final position of entry end 13 is determined, the final position of the screen 20 with respect to the slab 10 is likewise determined. Accordingly, the barrier screen 20 is secured to the surface 16 of slab 10 only after the final position of the entry end 13 of the conduit 14 is determined.

The barrier screen 20 can only be effective as a barrier against termites and the like if the screen 20 is permanently secured to the slab 10 and the conduit entry end 13 with a termite-proof material. In accordance with the invention, the screen 20 is secured with a termite-proof adhesive sealant 22 or the like which both bonds the screen 20 to the slab 10 and to the conduit entry end 13 and forms a termite-proof barrier which prevents termites and other pests from passing between the screen 20 and slab 10 through the pass-through hole 21. It has been found that a modified bitumen based sealant or the like such as Polyguard® Term Sealant Barrier (applied either in tape or paste form) performs well as a termite barrier and adhesive for securing the barrier screen 20.

In alternative embodiments, an additional barrier material may be included in the structure of the invention. For example, as illustrated in FIG. 3 a granular barrier material 25 may be placed in bath trap 12 below the barrier screen 20. The granular material may be physical barrier material such as crushed rock or chemically-treated barrier material. The only requirement of such granular barrier material is that it be sufficiently porous to permit the passage of water but sufficiently dense to inhibit termite penetration.

It will be appreciated that using the processes described to produce the structures of the invention simplifies construction techniques while producing barriers to pest invasion without use of chemical or other environmentally hazardous materials. The barriers are relatively simple and inexpensive to install, environmentally safe, and endure for the full life of the structure without further maintenance.

While only one conduit 14 is illustrated in the drawing, many bath traps accommodate a plurality of upwardly-extending conduits. It should be recognized, therefore, that the principles of the invention are equally applicable to forming bath trap barriers which accommodate more than one subterranean conduit.

It will be appreciated that the invention is not limited to any particular dimensions, materials or arrangement of components. Various materials of construction and conventional components will be found suitable by those skilled in the art, and the arrangement, size and location of the various components may be varied as desired.

While only exemplary embodiments of the invention have been illustrated and described in detail herein, it will be readily recognized that the principles of the invention may be used in various forms to provide pest bathers for bath traps and the like in accordance with the invention. It is to be understood, therefore, that even though numerous characteristics and advantages of the invention have been set forth in detail herein, the foregoing description, together with details of the structure and function of the various embodiments, is to be considered illustrative only. Various changes and modifications may be made in detail, especially in matters of shape, size and materials as well as arrangement and combination of parts, without departing from the spirit and scope of the invention as defined by the appended claims.

What is claimed:

1. A method of construction comprising the steps of:
    (a) forming a concrete slab on an earthen base with an underground conduit projecting upwardly from said earthen base; said slab having a top surface and a bottom surface;
    (b) forming an opening in said concrete slab which defines a bath trap surrounding an upwardly extending conduit;
    (c) forming a termite-proof barrier of sufficient dimensions to overlap all edges of and completely cover said bath trap;
    (d) forming a pass-through hole in said barrier to permit said upwardly extending conduit to project therethrough;
    (e) placing said harrier on the top surface of said slab with said conduit projecting through said pass-through hole;
    (f) adjusting the lateral position of said conduit while simultaneously moving said barrier over the top surface of said slab to re-position said conduit within said bath trap and re-position said barrier in an end-use position on the top surface of said slab to form a barrier which permits passage of water through said bath trap surrounding said conduit but prevents passage of burrowing pests therethrough;
    (g) securing said conduit to said barrier with a termite-proof adhesive sealant which completely blocks passage of pests through said pass-through hole;
    (h) securing said conduit in its desired end-use position; and
    (i) after securing said conduit in its end-use position, securing said ten nit proof barrier to the top surface of said slab with a termite-proof adhesive sealant and in a position which completely covers said bath trap.

2. The method defined in claim 1 wherein said barrier is a stainless steel screen having aperture sizes in the range of about 0.018 inch.

3. The method of claim 1 wherein said adhesive sealant is a modified bitumen based sealant.

4. The method defined in claim 1 further including the step of positioning a granular barrier material in said bath trap below said termite-proof barrier.

5. A bath trap barrier constructed in accordance with the method of claim 1.

\* \* \* \* \*